US 8,412,808 B2

(12) United States Patent
Carr et al.

(10) Patent No.: US 8,412,808 B2
(45) Date of Patent: Apr. 2, 2013

(54) METHOD AND FRAMEWORK FOR SERVICE-BASED REMOTE SUPPORT DELIVERY

(75) Inventors: Adam Michael Carr, Fort Collins, CO (US); Jon Christopher Connelly, Windsor, CO (US); Kimberly C. Horn, Fort Collins, CO (US); Milica Tutush Yonkaitis, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3509 days.

(21) Appl. No.: 10/225,785

(22) Filed: Aug. 21, 2002

(65) Prior Publication Data
US 2004/0039804 A1    Feb. 26, 2004

(51) Int. Cl.
*G06F 15/173* (2006.01)
*G06F 15/16* (2006.01)

(52) U.S. Cl. .................. 709/223; 709/201; 709/203

(58) Field of Classification Search .................. 709/223, 709/201, 203; 370/352
See application file for complete search history.

(56) References Cited

U.S. PATENT DOCUMENTS

| 6,769,022 B1* | 7/2004 | DeKoning et al. ............. 709/223 |
| 2003/0128696 A1* | 7/2003 | Wengrovitz et al. ........... 370/352 |
| 2003/0163568 A1* | 8/2003 | Kano et al. ..................... 709/225 |

* cited by examiner

*Primary Examiner* — Karen Tang (57) ABSTRACT

In a service-based remote support delivery system, service engineers supported by an analysis server receive incident reports from both personal computers and from unmanned servers within an enterprise. The incidents arise both from user-created reports of problems, from event annunciators that monitor hardware and software to report events as they occur, and from the periodic gathering of configuration data. These incident reports are combined with host information and contact information and are transmitted to the analysis server as the central site for processing. All incidents in large enterprises are first collected and stored on an SPOP node. Both proactive and reactive system monitoring is thus combined into a uniform system.

32 Claims, 6 Drawing Sheets

The present invention relates generally to providing main- the Hewlett Packard HP3000 and HP9000 business servers.
METHOD AND FRAMEWORK FOR SERVICE-BASED REMOTE SUPPORT DELIVERY

CROSS-REFERENCE TO RELATED PATENT APPLICATIONS

This application hereby incorporates by reference for all purposes the specifications and drawings of application Ser. No. 09/851,963 filed on May 10, 2001, Van Giel et al. and application Ser. No. 10/135,398 filed on May 1, 2002, Soto et al., both of which have the same assignee as the present application.

BACKGROUND OF THE INVENTION

1. Field of the Invention

The present invention relates generally to providing maintenance and support of both hardware and software on computers. In particular, it relates to the automatic detection of problems and issues on computers within an enterprise and the provision of maintenance and repair services from a remote central site.

2. Description of the Related Art

As a number of personal computers and servers used throughout business enterprises has increased, and as the price of the hardware and software has decreased, the cost of setting up and maintaining a large array of networked computers has come to be dominated by cost of servicing the computers and keeping them all operating. In the past, this was done by manual intervention, with service personnel visiting each computer or with the computers being brought in for repair. But the cost of providing such manual service is high, and the difficulties of providing trained staff members able to cope with any problem that might arise on any given computer has also grown. Additionally, the time it takes for service personnel to visit a site greatly increases the time during which a given computer may be out of service due to some problem.

Accordingly, attempts have been made in the past to automate some or all of the tasks relating to computer maintenance and repair. With respect to personal computers, a first approach has been to make available to the user, on the computer itself and also within service sites maintained on the Internet, knowledge data bases containing detailed documentary descriptions of the programs, and also self-help tools. Thus, for example, one may learn from a centralized database that new software drivers for hardware accessories are available, and these may be downloaded and automatically installed on personal computers. Likewise, software patch analyzers are available which can trace a problem to software defects and which can suggest the downloading of more recent versions of the software that may cure those problems.

An even more sophisticated approach to PC maintenance is provided by the ServiceNet platform developed by Motive Communications, Incorporated. ServiceNet is designed around a self-help paradigm in which a person using a desktop computer notices a problem and then manually opens a "trouble ticket" that is transmitted to a support provider. The PC operator uses a web interface to report the problem to a program called Chorus Client, which is an incident escalator. The incident escalator first may try to run prewritten diagnostic scripts or provide "self-help" tools. It may then "isolate" the incident, running scripts to gather configuration data, and then combining the user's problem description and the configuration data with contact information identifying the user of the computer and including such things as name, e-mail address, and telephone number. It may also gather host information from the PC. These are transmitted to an incident receiver which parses the information and passes it on to a central analysis server where a program called Duet, in combination with a program called Insight, enable the provision of "online" assistance by a service engineer to review the problem in the context of the user's computer as configured and to provide assistance.

In general, self-support tools such as those described above do not offer-automated monitoring nor automated problem detection capabilities. To the extent that such capabilities are available, automated problem detection and support currently focuses upon product-specific or market-specific functionality. For example, Hewlett Packard provides a product called predictive support that enables remote failure detection for the Hewlett Packard HP3000 and HP9000 business servers. This is a modem-based solution, where each client computer directly dials into a support center to give notification of a device failure. In the area of disk drives, Hitachi has a system called Hi-Track that provides remote event management and configuration management for the Hitachi 7700 and 7900 disc arrays. EMC provides similar functionality for its Symmetrix line of storage devices. Hewlett Packard's High Availability Observatory (HAO) provides remote event management for Hewlett Packard's line of SuperDome servers and also configuration management for their HP9000 servers, Windows 2000 servers, and some proprietary routers and switches. Hewlett Packard also has a product called Network Support Platform which provides configuration management, discovery, and remote connectivity for network inter-connect devices that include Hewlett Packard, Sysco, and Nortel routers, switches, and hubs.

While these products are useful, they tend to focus on functionality that is more useful to the support provider than to the organization that owns the computers. They do not allow the local administrator of the computers to interact with the tools or to observe the data transmitted to the support provider. And they are also typically dependant upon the use of serial-line technologies, such as modems or ISDN telephone lines, which present limitations in terms of scalability and performance.

SUMMARY OF THE INVENTION

Briefly summarized, an embodiment of the present invention is a framework for managing incident information in an enterprise environment. It comprises one or more nodes, and one or more event annunciators and event handlers on each node arranged to detect events occurring on monitored hardware or software associated with each node. It further comprises an incident generator on at least one or more nodes having an interface that can accept event information from handlers and that generates incident information, and also an incident escalator on at least one or more nodes that accepts incident information from said generators, combines it with host and contact information, and forwards the combined information. And it also comprises a response center where combined information is managed and made available to service personnel.

Another embodiment comprises a method of managing incident information in an enterprise environment. This method comprises collecting records of events arising from hardware or software indicators of possible abnormalities, and determining by further analysis if such an event is indicative of an incident; generating incident reports when incidents are detected: combining reports of incidents with host and contact information, and forwarding the combined information; and receiving and managing such information at a response center, and making it available to service personnel.

DETAILED DESCRIPTION

An embodiment of the present invention is primarily built on top of, and is designed to enhance and augment, a product called the ServiceNet Platform developed by Motive Communications, Incorporated.

Figure 1:
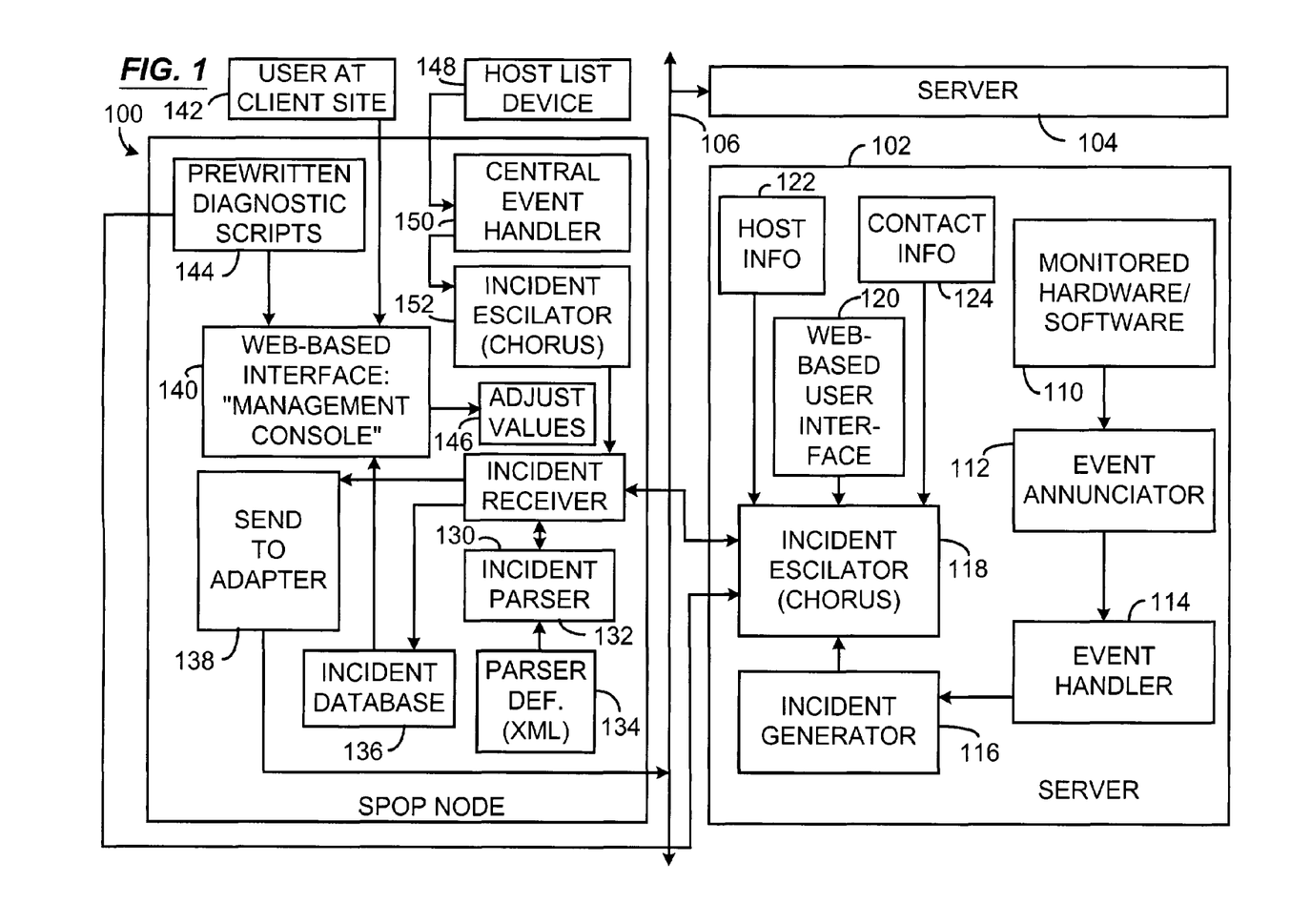
FIG. 1 illustrates a first embodiment of the invention that utilizes an SPOP node to monitor both reactive and proactive incidents originating from a number of servers at a remote site.

With reference to FIG. 1, a server 102 is shown. Assuming for the moment, for the purpose of briefly describing ServiceNet, that this is a personal computer (rather than a server), the ServiceNet system works conventionally (in its unmodified state) in the following manner. When the user of this personal computer detects a problem, the user clicks on a "service" icon (on the user's desktop or within an application, for example) that causes a web browser to bring up a web-based user interface 120 which provides the user with a form into which the user may enter a description of the problem. This information is then passed to a program called Motive Chorus, a client program that resides upon the personal computer and that serves as an interactive assistance tool, capable of running diagnostic scripts, and also as an incident escalator 118. In addition, the personal computer contains host information 122 and also contact information 124 defining the name, phone number, e-mail address of the operator of this particular computer to make it possible for service personnel to contact that individual. The escalator 118 may also run scripts 144 to gather configuration data. The incident escalator 118 combines this configuration data, host information, and contact information with the user-supplier information defining the incident, and then all of this information is passed on to an incident receiver 130 which records the incident in a database 136. Then programs called Motive Insight, Motive Duet, and Management Console information enable a service engineer to study the problem and to come up with possible solutions.

Figure 2:
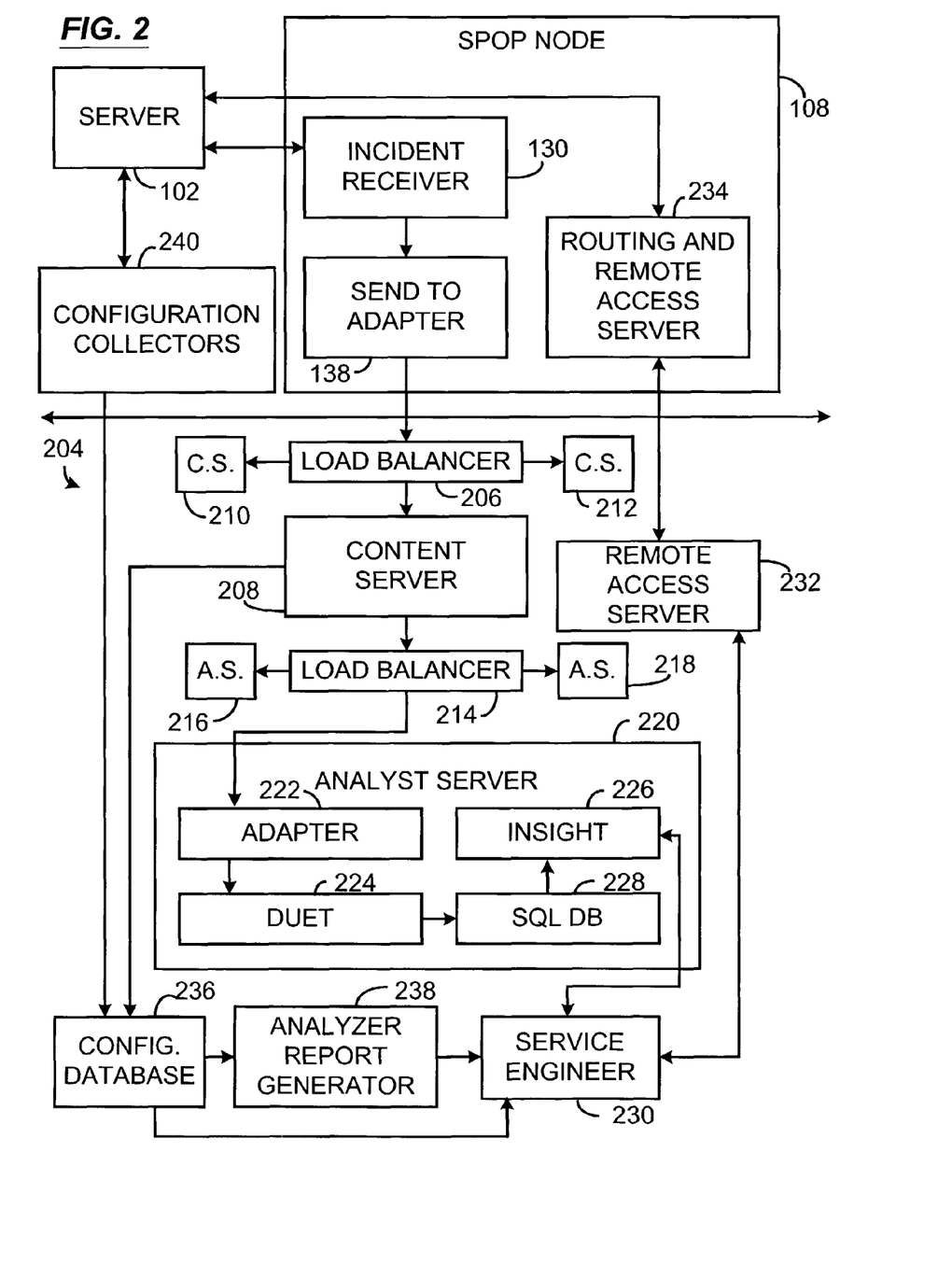
FIG. 2 illustrates a central site analysis server that is designed to communicate with SPOP nodes and servers such as those shown in FIG. 1, in this first embodiment of the invention.
Figure 4:
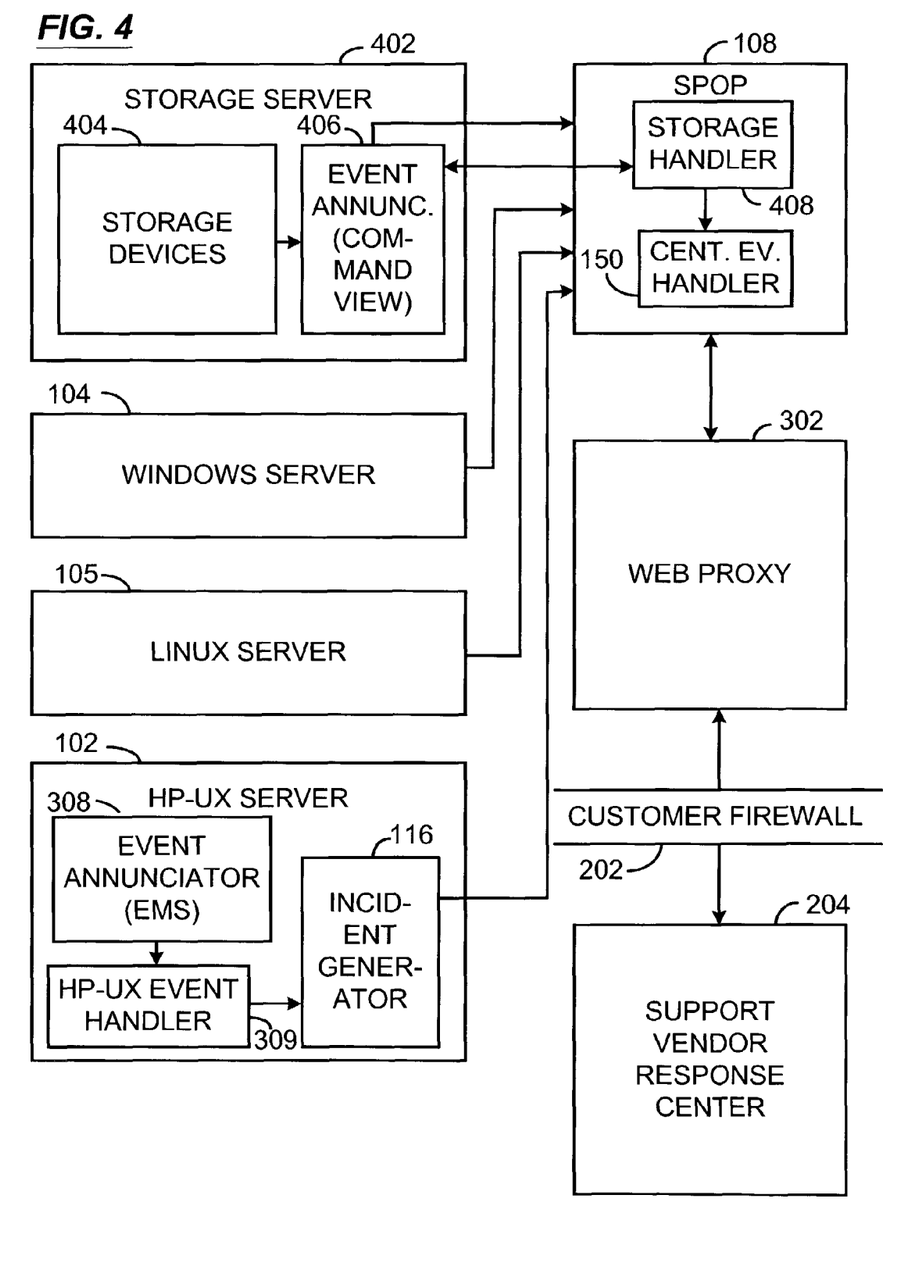
FIG. 4 illustrates a number of different types of servers interconnected to a central response center by an SPOP node, in accordance with the first embodiment of FIGS. 1 and 2.

The embodiment of the present invention shown in FIGS. 1, 2, and 4 utilizes all of these elements of the ServiceNet Platform, but redesigns them, enhances them, and augments them to provide additional and expanded services that greatly enhance the types of support that may be provided. In particular, proactive, or anticipatory data gathering actions and reactive, or event-triggered data gathering activities, are added to ServiceNet's user-reactive ability to log and to track events in a uniform manner, over many different hardware and software entities, as is explained below.

Referring now to FIG. 1, two typical, unattended servers 102 and 104 are shown and are presumed to be in an enterprise environment, interconnected by a network 106 to other enterprise devices. As can be seen, these servers are each equipped with an incident escalator 118, a web-based user interface 120, host information 122, and contact information 124. But since these servers typically run unattended, it is not normally possible to manually institute the creation of an incident record using the web-based user interface 120, as with a personal computer having a human operator. Instead, automatic event detectors are relied upon to detect significant events.

The server 102 contains both hardware and software that is monitored at 110. Associated with the monitored hardware and software 110 are one or more event annunciators 112. These event annunciators 112 may take widely differing forms depending upon the nature of the hardware or software that is monitored. For example, in some hardware, the event annunciators may be triggered into operation by an event occurring within or initiated by the hardware, such as an interrupt event or possibly a DMA event; or the annunciator may be placed into operation periodically by a timing mechanism to check for events. Thus, for example, in the case of a disk drive, the event annunciators may check records maintained by a disk drive of how frequently the drive is encountering certain types of errors, and may compare those records to limit values for error counts. Other event annunciators may check to see how rapidly software is operating, how many hardware errors are occurring during memory accesses, or they might check the basic configuration of the machine and its software both alone and also in comparison to other servers that are grouped together with this server to form a "cluster" so that they, the servers, may back each other up in case of a server failure.

When the event annunciator 112 discovers an event, it generates an announcement of the event, typically as an SNMP or TCP/IP message, that is routed to an event handler 114.

The event handler 114 is also customized to the monitored hardware or software 110, and follows up by investigating the event to see whether the event is one that may be ignored, whether it simply needs to be logged but does not-require an immediate response, or whether the event should be reported as an incident that may need to be brought to the attention of service personnel. Both the event annunciator 112 and the event handler 114 are custom designed to match the server 102's hardware and operating system. The event handler 114 resides upon the server 102. But it can communicate with both the event annunciator and the monitored hardware or software over the network, it may reside on another machine, or even upon the SPOP node 108 that is described at a later point.

If the event handler 114 decides that an incident report needs to be generated, in this embodiment the event handler generates a command line call which it passes to the operating system shell to be executed by the operating system. It thereby places into operation an incident generator 116. The Incident generator 116 has a generalized interface that makes it able to accept such calls from any kind of event annunciator and handler monitoring any type of hardware or software. The interface is a general one which transforms the incoming information into a standardized form as is required by the incident escalator, in this embodiment implemented with the client portion of the Motive Chorus program. The incident generator transforms the event information into the precise form required by the incident escalator and again calls upon the operating system shell to execute the incident escalator, passing the necessary information to it to cause the creation of an incident report, just as if the information had come from a user through the user interface 120. As explained above, the incident escalator 118 combines this incident information with contact information 124 defining who should be contacted and also with general host information 122 defining the hardware and software configuration of the server 102, and it forwards all of this information on to a central support vendor response center 204 as a report of a service or maintenance incident.

In addition to responding to hardware and software events occurring in real time, the incident generator 116 may respond to the periodic execution of configuration scripts included among the prewritten diagnostic scripts 144 which are triggered periodically to survey the general configuration of the server 102, providing an archival time record of the server's configuration and how it has changed over time. This configuration data can be of great benefit to service personnel. The configuration data is essentially disguised to appear to be an "incident" for purposes of combining it with host and contact information 122 and 124 and delivering it to the central response center 204.

In another change from the way the Motive Communication's ServiceNet system normally functions, the contact information 124 is expanded to include a number of different contacts, such as different daytime and nighttime administrators, backup administrators, and the like to provide for a much more workable arrangement in the context of a large enterprise with many unsupervised servers, as opposed to personal computers. In addition, the host information 122 is augmented with information identifying the particular server from which the information is gathered. This information is incorporated into messages available to users at the client site 142 so that they may identify the server that gave rise to an incident.

Figure 3:
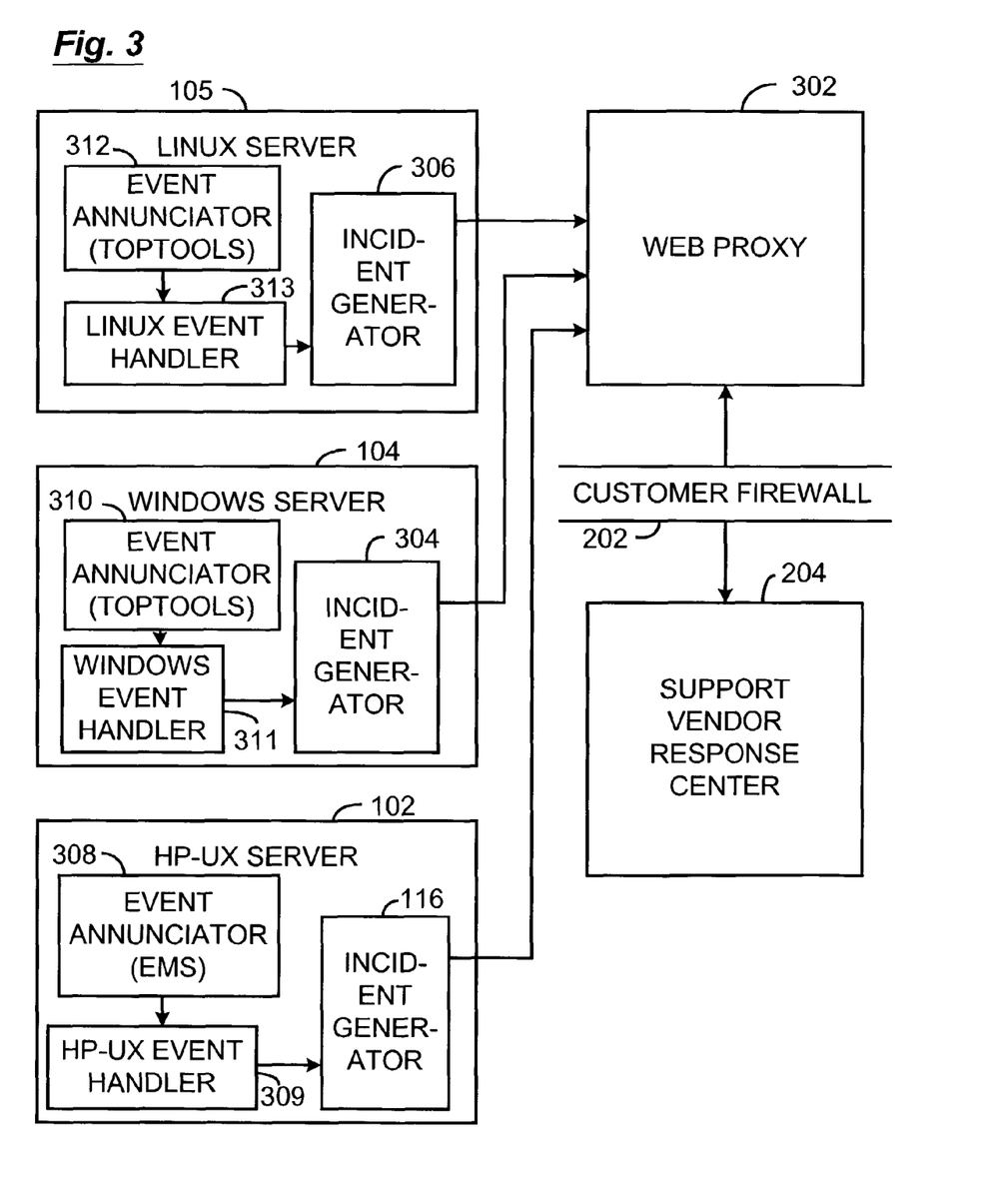
FIG. 3 illustrates a second embodiment of the invention wherein three different types of servers are interconnected to a central response center directly by a web proxy.

Referring now to FIG. 3, an embodiment of the invention different from that shown in FIG. 1 is illustrated. In this embodiment, three different types of servers, 102, 104, and 105 are shown having their incident generators 116, 304, and 306 communicating through a conventional web proxy 302 and through a customer fire wall 202 with a support vendor response center 204. This is a typical insulation configuration of the present invention at a small site having a limited number of computers, where each of those computers communicates directly over the web with the vendor response center 204, rather than through an intermediary SPOP node 108 as is illustrated in the alternative embodiment of FIGS. 1, 2, and 4.

The first server 102 is equipped with the HP-UX operating system of Hewlett Packard. It also contains an event annunciator 308 called EMS 308 (Hewlett Packard's EMS HA Monitor). EMS 308 is an event monitoring system and annunciator that can be programmed to trigger an event when a disk fails or when any other type of critical problem arises. EMS is able to generate messages using multiple protocols such as opcmsg, TCP/IP, and UDP. Thus, EMS operating on an HP-UX server such as 102 can function as the event annunciator 112 shown in FIG. 1. The HP-UX event handler 309 corresponds to the event handler 114 (FIG. 1) customized in accordance with the particularities of the HP-UX operating system running the server 102.

The server 104 is equipped with, for example, the Windows 2000 operating system, and the server 105 is equipped with the Linux operating system. These servers, both of which are Hewlett Packard computers, can utilize the Hewlett Packard program TopTools as an event annunciator 310. TopTools is an inventory and diagnostic software package that tracks hardware inventory and serial numbers and that detects such things as, for example, whether a computer is overheating. It can also be used to update the BIOS, and it can also lend itself to use on printers as well as on machines running HP-UX.

In FIG. 3, the incident generators 116, 304, and 306 communicate directly with a remote support vendor response center 204. This is useful in the case where there are not very many computers, and thus no particular need to concentrate incident management on a server located at the enterprise site. With larger enterprises, a different embodiment of invention is shown in FIGS. 1, 2, and 4. In particular, all of the incident escalators and/or generators feed their incident messages into an SPOP (Support Point Of Presence) node (or server) 108 where the incident messages are preprocessed and then stored before being transmitted to the support vendor response center 204.

This has a number of advantages, but one of them in particular is illustrated in FIG. 4. A storage server 402 is shown which is not necessarily compatible with the Motive software. It includes storage devices 404 which need to be monitored. To accomplish that, a Hewlett Packard program called CommandView is installed on the storage server 402 to serve as an event annunciator 406, and a CommandView compatible storage handler 408 is installed upon the SPOP node 108. The CommandView annunciator 406 and handler 408 thus can generate incidents that may be fed through a central event handler 150 and an incident escalator 150 (FIG. 1) directly into an incident receiver 130 all of which are installed right on the SPOP node 108. While normally that would cause the incidents to be merged with the incorrect host information and contact information (gathered from the SPOP node 108, rather than from the storage server 402), modifications in the way the Motive system operates cause the proper contact information and host information to be substituted for that normally gathered so that the incident properly identifies the storage server 402 as well as those who must be contacted when it is in need of service.

Referring once again to FIG. 1, the details of some of the software installed upon the SPOP node 108 are shown.

The SPOP node 108 contains an incident receiver 130, another software program provided by Motive Communications. The incident information coming in from the servers and, possibly, other devices must be parsed, and this is carried out by an incident parser 132. The particular messages within the incident reports are in accord with a program language design specification that is stored in and defined by an XML file called a parser definition 134. When the incident parser 132 starts up, it reads in the XML parser definition 134, and this configures the parser 132 to parse the particular types of messages which the incident escalators 118 are generating.

The parsed messages, including incident information, contact information, and host information, are stored in an incident database 136. This enables the user at the client site 142, by means of a web-based interface called a "management console" 140, also provided by Motive Communications (but heavily modified to serve the purposes of the present invention), to view the incidents and to check out their status—whether opened or closed or whatever. The user 142 may also use a program called Motive Insight, utilizing prewritten diagnostic scripts 144, to browse though incident information. The user interface web pages that support the user interface 120 within the server 102 are also conveniently stored on the SPOP node 108 among the prewritten diagnostic scripts 144. Both the diagnostic scripts 144 and the user interface pages may be downloaded by service technicians and changed from time to time to keep the entire system current.

The web-based interface 140 allows a user to adjust values 146, such as values defining the names, telephone numbers, and e-mail addresses of the multiple administrators and what servers they are to be the contact persons for in case of trouble, and other such things. The management console 140 is used to place the proper contact information into the files that the incident escalator 118 uses to populate incidents. The contact information 124 is contained in a flat file that may be defined and installed upon a computer at the time the computer is first set up with its software, and that can be easily modified later on.

As a result of all this, an administrator at an enterprise site can, without assistance from the vendor response center 204, set up accounts for inside users and view Motive Duet log files of incidents that have occurred and of how they have been handled. The administrator may adjust configuration values 146 and other perimeters of the Motive system.

FIG. 2 illustrates, at 204, the support vendor response center to which information defining incidents is sent by the send to adapter 138. This information crosses the Internet and fire walls and enters into a load balancer 206 which may be a router routing incoming messages relatively evenly to each of a number of content servers 208, 210, and 212. Content servers are servers typically located outside the main fire wall of the support vender where they may be accessed more readily by PCs and servers at customer sites, and in particular by the send to adapter 138 on the SPOP node 108 at client sites. The load balancer 206 is necessary because many messages defining incidents may be received at about the same time from many different enterprises, and also because the content servers are also used for many other client support purposes as well.

If the incoming message is an incident report, then the content server 208 sends it through the support vender's fire wall to a secondary load balancer 204 which routes it to an available analysis server, 220, one of several analysis servers 216, 218, and 220 that may be available at any given time to handle the load of incoming incident and configuration messages.

These messages first flow to an adapter 222 which responds to those parts of the incoming messages which have been customized beyond what is normally to be found in a Motive Communications incident message. Thus, for example, messages disguised as incidents but actually reporting the configuration of a server, such as those generated by configuration scripts, are intercepted and are routed to a configuration database 236 which thereby is able to maintain a historic record of a given computer's configuration. These may be further processed by an analyzer and report generator 238, or they may be accessed directly by a service engineer 230 upon demand. An HAO collector 240, which may be installed upon the SPOP node 108 and which performs many routine monitoring tasks, may also provide data to the configuration database 236 (serving as a "tracker database") as is fully explained in application Ser. No. 09/851,963 filed May 10, 2001 (Van Giel et al.).

The remaining insight messages flow directly into Motive Communication's duet program 224 where they are organized and stored within an SQL database 228. The service engineer, at 230, then utilizes the Motive Insight program 226 to retrieve and to view these incident messages and to process the incidents appropriately. The service engineer 230 may place a phone call or send an e-mail message to the responsible contact person at the client site. In one embodiment of the invention, the service engineer 230 is also able to gain access to remote access server 232 and to routing and remote access server software 234 installed upon the SPOP node 108 using highly secure communication techniques to actually take direct control of the SPOP node computer 108, with the service engineer 230's display and keyboard functioning as if they were connected directly to the SPOP node 108, so that the service engineer may directly access the server 102 and other servers at the client enterprise site to exercise them, display their perimeters, and investigate any problem. This is described in the application Ser. No. 10/135,398 filed on May 1, 2002 (Soto, et al.). And as noted above, the configuration database 236 may also be a tracker database that works with Configuration collectors 240 installed at the client enterprise site to periodically monitor and record status information gathered from the servers at the client site, placing the recorded data into the database 236. This recorded data may then be analyzed by an analyzer and report generator 238 and transformed into reports which the service engineer 230 may call up and review at need. Accordingly, the service engineer 230 has at his or her fingertips much useful information to assist him or her in servicing the server 102, almost as if the service engineer 230 were present at the client site accessing the server 102 directly. And, with the aid of the historical configuration and recorded information contained within the tracker and configuration database 236, the service engineer 230 may be in a better position to perform diagnostic and repair tasks than he or she would be if actually present at the client site.

Automatic problem detection and solution delivery are fundamental services that are offered through these embodiments of the invention. From the customer's perspective, problems are automatically detected for supported devices, and the support center is notified so that the appropriate action may be taken, all without any action being required on the part of the customer. The customer is also given a view of the problem notification, and also has the ability to track the status of the problem. For example, the customer is permitted to view open incidents, closed incidents, to reconfigure various options, and to view detailed system information. Online help is available, and in appropriate cases a customer may be placed in contact with various online aids that can install drivers, reconfigure printers, perform tests, and in other ways aid the customer in performing diagnosis, as well as permitting support center assistance.

Figure 5:
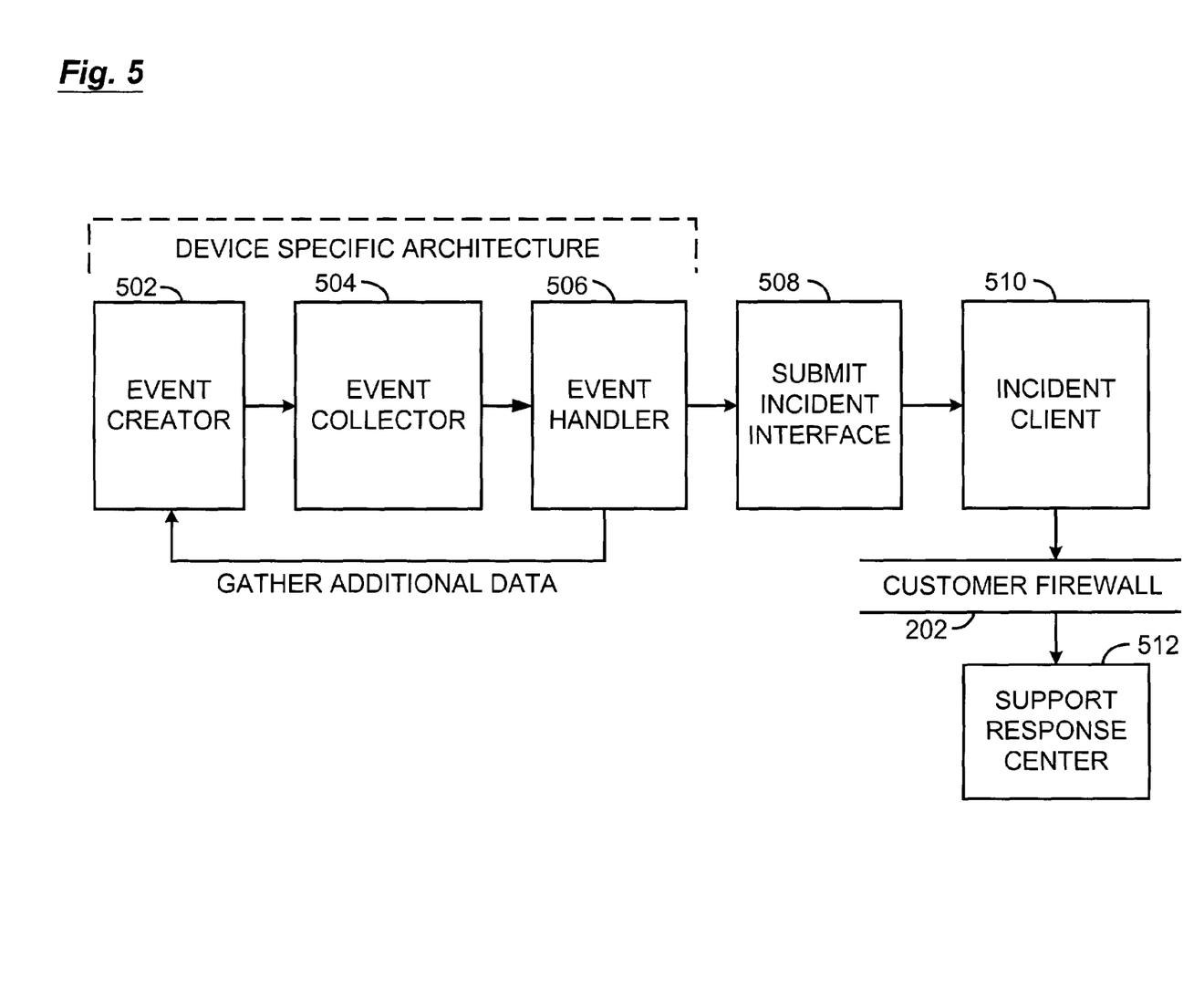
FIG. 5 illustrates the automated flow of events from their initial occurrence to their delivery to a response center in both embodiments of the invention.

Regardless of the type of device, the type of PC or server, or the source of an error, the same general series of steps is carried out to accomplish problem detection and the delivery of a solution. With reference to FIG. 5, the event creator 502, which might be a hard disk drive, a program, a computer's temperature monitoring device, passes information to an event collector 504, which could be the event annunciator 112 described above, the storage handler 408, or one of the annunciators 308, 310, or 312. The incident is reported to an event handler 506, which might be the invent handler 114 or one of the event handlers 309, 312, 313, or 150. The event handler 506 differs from the event collector 504 in that it is normally able to gather additional data from the event creator 502. The event handler 506 may contain some intelligence and may be able to analyze the incident and other data and decide whether the event is in fact a critical one that needs to be escalated to the status of an incident.

If so, then the information is passed on to a submit incident interface 506 which is presented, for example, by the incident generator 116 or one of the generators 116, 304, or 306 which feeds information into the incident escalator 118. The information then reaches the incident client 510, which is one of the incident escalators 118 or 152. The user may also use the interface 120 to manually create an incident for the escalator 118, or a periodically run configuration gathering script may signal an incident to the escalator 118 or receiver 130.

The incident information then passes through the customer fire wall 202 and reaches the support response center 204 where it is processed as explained above.

Note that the first three steps 502, 504, and 506 are device specific, in that they need to be customized to the particularities of the event creator 502. The submit incident interface 508 needs only to be customized to the needs of the particular computer or operating system, and it may be remotely located, for example, on the SPOP node 108 (within the central event handler 150, for example). And, of course, incident information may also come directly from users of personal computers and from periodic configuration data go the ring. Accordingly, the processing of all incident information, whether manually or automatically generated, and whether resulting from proactive periodic configuration gathering or from reactive response to events occurring in the monitored hardware or software, is done in a uniform manner, with a well-defined incident interface, and with the service engineer being presented a uniform, well-organized set of tools for viewing and for taking actions.

After an incoming incident has been captured, it may be tied in with an enterprise entitlement system, in this case a system named EDIMGR, as well as with an enterprise workflow tool, WFM, both of which are products of Hewlett Packard in this embodiment. Service engineers 230 thus can follow the general flow of steps detailed in FIG. 6, which presents the entitlement and workflow general algorithm. Once a trouble ticket has been created within the workflow system, the workflow identifier and current status is propagated right back to the customer environment so that the customer may track the status of their problem as it is processed.

Figure 6:
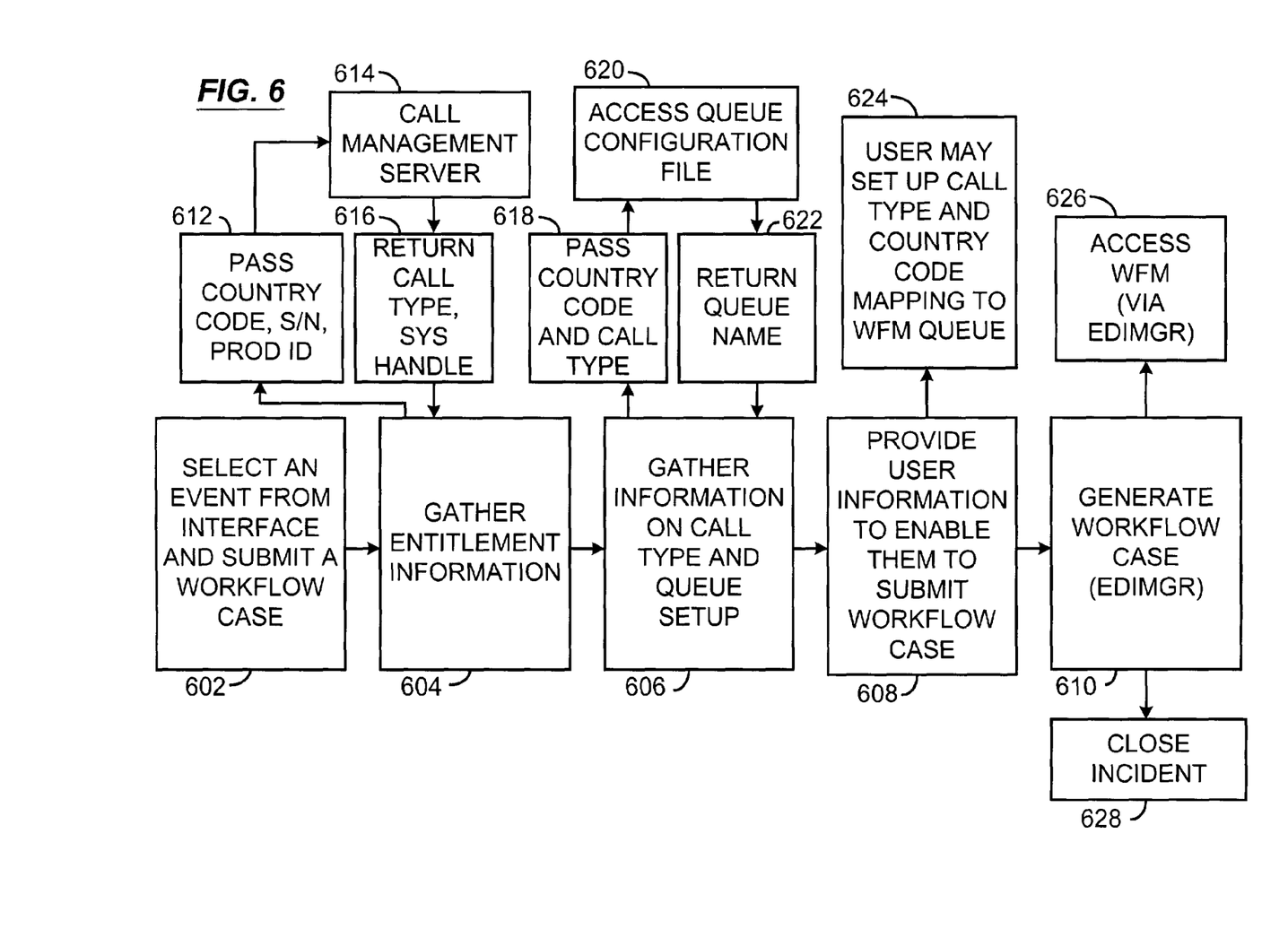
FIG. 6 illustrates how the event information can trigger the creation of a workflow management case in both embodiments of the invention.

Referring now to FIG. 6, a service engineer initially selects an event from the interface and then submits a workflow case (step 602). Next, at step 604, entitlement information is gathered. This is done by passing the country code, serial number, and product I.D. (step 604) to a call management server 614 which returns a system handle and a call-type identifier that indicates the entitlement.

Also at step 606, information is gathered on the call type, and the information queue is established. The country code and the call type are passed, at step 618, into an access queue configuration file 620, and the queue name is then returned at step 622.

Next, at step 608, the necessary user information is established to enable the submission of a workflow case. The mapping of the customer's country code and call type to a workflow management queue is accomplished at step 624.

Finally, at step 610, the workflow case is generated, in this case using the Hewlett Packard program EDIMGR. The system handle may then be used to access the workflow manager at step 626. The motive incident is then closed at step 628. In this manner, the incident becomes a workflow managed project for service personnel.

The invention claimed is:

1. A framework for managing incident information in an enterprise environment comprising:
    one or more nodes;
    one or more event annunciators and event handlers on each node arranged to detect events occurring on monitored hardware or software associated with each node;
    an incident generator on at least one or more nodes having an interface that can accept event information from the handlers and that generates incident information;
    an incident escalator on at least one or more nodes that accepts the incident information from said generators, combines it with host information defining configuration information and contact information defining who should be contacted, and forwards the combined information; and
    a response center where the combined information is managed and made available to service personnel.

2. A framework in accordance with claim 1 which further comprises:
    one or more nodes within an enterprise where the combined information is accepted and stored and from which such information is sent to the response center.

3. A framework in accordance with claim 2 wherein one or more nodes other than those where the combined information is accepted and stored have a resident incident escalator.

4. A framework in accordance with claim 2 wherein one or more of the nodes within the enterprise where the combined information is accepted and stored has a resident incident escalator.

5. A framework in accordance with claim 2 wherein the one or more of the nodes having a resident incident escalator also has a central event handler arranged to received the event information from the event annunciators on one or more other nodes.

6. A framework in accordance with claim 2 wherein the one or more nodes where combined information is accepted and stored further comprises:
    an incident receiver that receives incoming combined information;
    an incident database where the combined information is stored; and
    an adapter that sends combined information to the response center.

7. A framework in accordance with claim 6 which further comprises:
    an incident parser connected to said incident receiver and used by the receiver to parse the incoming combined information.

8. A framework in accordance with claim 7 which further comprises:
    a parser definition that determines and controls the operation of the parser by defining the syntax of the incoming combined information.

9. A framework in accordance with claim 6 which further comprises:
    a central event handler arranged to receive event information form host devices:
    an incident escalator arranged to receive event or incident information from the central event handler and to generate the combined information for presentation to the incident receiver.

10. A framework in accordance with claim 2 wherein the one or more nodes where the combined information is accepted and stored further comprise:
    prewritten diagnostic scripts;
    at least some of those scripts defining the gathering of server configuration data;
    a mechanism that periodically causes at least some of those scripts defining gathering to be executed on one or more nodes, supplying their data as event information to an incident generator, as incident information to an incident escalator, or as combined information; and
    a configuration database at the response center that accepts such configuration data.

11. A framework in accordance with claim 1 wherein the response center further comprises:

an analyst server including a database combined information and software tools for enabling service personnel to manage and review such information.

12. A framework accordance with claim 11 which further comprises
a tracker data base containing data gathered from one or more nodes.

13. A framework in accordance with claim 12 which further includes an analyzer and report generator connected to the tracker data base.

14. A framework in accordance with claim 11 which comprises an arrangement of at
east one remote access server program that gives the service personnel direct control access to one or more nodes.

15. A framework in accordance with claim 14 which further comprises
a highly secure network path between said service personnel and a service point of presence node to access a remote access server program on said service nodes, from which node access giving service personnel direct control access to one or more nodes may be achieved.

16. A framework in accordance with claim 2, wherein
said one or more nodes with the enterprise where combined information is accepted and stored include a management console for users at the enterprise site to gain access to stored combined information.

17. A method of managing incident information in an enterprise environment comprising:
collecting records of events arising from hardware or software indicators of possible abnormalities, and determining by further analysis if such an event is indicative of an incident;
generating incident reports when incidents are detected;
combining reports of incidents with host information defining configuration information and contact information defining who should be contacted, and forwarding the resultant combined information; and
receiving and managing such information at a response center, and making it available to service personnel.

18. A method in accordance with claim 17 further comprising:
accepting and storing such combined information locally in an incident database established on a node within the enterprise prior to sending it on to a response center.

19. A method in accordance with claim 18 further comprising:
at least some of the time, carrying out the combining step on the same node where the collecting and generation steps are carried out.

20. A method in accordance with claim 18 further comprising:
at least some of the time, carrying out the combining step on the node with the incident database, while the collecting and generating steps for the same information are carried out on other nodes.

21. A method in accordance with claim 18 further comprising:
at least some of the time, carrying out the generating step on a node other than where the collecting and generating steps for the same information is carried out.

22. A method in accordance with claim 18, wherein, on a node having an incident database, the following steps are carried out:
receiving the incoming combined information;
storing such information in the incident database; and
sending the combined information on to the response center.

23. A method in accordance with claim 22 which further comprises:
parsing the incoming information before saving it.

24. A method in accordance with claim 23 which further comprises:
providing a definition of the syntax of the combined information to guide the parser.

25. A method in accordance with claim 22 which further comprises:
receiving event information form the host devices; and
carrying out the generating and combining steps on the same node where the event information is received.

26. A method in accordance with claim 18 which further comprise:
gathering node configuration data:
earring out the generating and combining steps as to this configuration data; and
intercepting and saving this data at a response center in a configuration data base.

27. A method in accordance with claim 17 wherein the steps carried out at a response center comprise:
arranging for service personnel to manage and review incoming information.

28. A method in accordance with the claim 27, which further comprises gathering configuration data from nodes and saving it in a tracker database at a service center.

29. A method in accordance with claim 28 which further includes:
analyzing and gathering reports from the data contained within the tracker data base.

30. A method in accordance with claim 28 which further comprises giving service personnel at a response center access to nodes from which combined information has been gathered as well as to the gathered information.

31. A method in accordance with claim 30 which further comprises providing such access over a highly secure network path between said services personnel and a service point of presence node within the enterprise, giving service personnel direct control access to one or more nodes of the enterprise.

32. A method in accordance with claim 18 wherein
providing at an enterprise site user access to stored combined information.

* * * * *

UNITED STATES PATENT AND TRADEMARK OFFICE
CERTIFICATE OF CORRECTION

PATENT NO. : 8,412,808 B2
APPLICATION NO. : 10/225785
DATED : April 2, 2013
INVENTOR(S) : Adam Michael Carr et al.

It is certified that error appears in the above-identified patent and that said Letters Patent is hereby corrected as shown below:

In the Claims:

In column 10, line 23, in Claim 5, delete "received" and insert -- receive --, therefor.

In column 10, line 48, in Claim 9, delete "form" and insert -- from --, therefor.

In column 10, line 48, in Claim 9, delete "devices:" and insert -- devices; --, therefor.

In column 11, line 1, in Claim 11, delete "database" and insert -- database for --, therefor.

In column 11, line 4, in Claim 12, delete "accordance" and insert -- in accordance --, therefor.

In column 11, line 11, in Claim 14, delete "which" and insert -- which further --, therefor.

In column 11, line 13, in Claim 14, delete "east" and insert -- least --, therefor.

In column 11, line 20, in Claim 15, delete "nodes," and insert -- node, --, therefor.

In column 11, line 24, in Claim 16, delete "with" and insert -- within --, therefor.

In column 11, line 49, in Claim 19, delete "generation" and insert -- generating --, therefor.

In column 12, line 5, in Claim 21, delete "is" and insert -- are --, therefor.

In column 12, line 22, in Claim 25, delete "form the" and insert -- from --, therefor.

In column 12, line 28, in Claim 26, delete "earring" and insert -- carrying --, therefor.

In column 12, line 36, in Claim 28, delete "with the" and insert -- with --, therefor.

Signed and Sealed this
Twentieth Day of August, 2013

Teresa Stanek Rea
*Acting Director of the United States Patent and Trademark Office*

CERTIFICATE OF CORRECTION (continued)
U.S. Pat. No. 8,412,808 B2

In column 12, line 41, in Claim 29, delete "gathering" and insert -- generating --, therefor.

In column 12, line 49, in Claim 31, delete "services" and insert -- service --, therefor.